United States Patent [19]

Milano

[11] Patent Number: 4,877,280
[45] Date of Patent: Oct. 31, 1989

[54] PAPER PICK-UP DEVICE

[76] Inventor: Reed Milano, 510 Valido Rd., Arcadia, Calif. 91006

[21] Appl. No.: 208,843

[22] Filed: Jun. 9, 1988

Related U.S. Application Data

[63] Continuation of Ser. No. 859,045, May 2, 1986, abandoned, which is a continuation-in-part of Ser. No. 732,144, May 9, 1985, abandoned.

[51] Int. Cl.⁴ .......................... A47J 43/28; B25B 9/02; B25J 1/02
[52] U.S. Cl. .................................... 294/99.2
[58] Field of Search ..................... 294/1.1, 1.2, 8.5, 11, 294/16, 25, 27.1, 28, 31.1, 33, 50.8, 50.9, 61, 99.1, 99.2, 106, 902; 271/19

[56] References Cited

U.S. PATENT DOCUMENTS

| | | |
|---|---|---|
| 1,045,640 | 11/1912 | Thompson . |
| 2,033,050 | 3/1936 | Pankonin . |
| 2,362,395 | 11/1944 | Ozdobinski ............................ 294/8.5 |
| 2,525,678 | 10/1950 | Hout ..................................... 294/50.8 |
| 2,647,006 | 7/1953 | Coyle ..................................... 294/8.5 |
| 2,777,724 | 1/1957 | Carter .................................... 294/25 |
| 3,108,834 | 10/1963 | Cassara . |
| 3,265,068 | 8/1966 | Holohan ............................. 294/99.2 |
| 3,692,347 | 9/1972 | Bixler . |
| 4,093,297 | 6/1978 | Reiber ................................ 294/99.1 |
| 4,126,345 | 11/1978 | List ....................................... 294/1.2 |
| 4,212,305 | 7/1980 | Lahay .................................. 294/99.2 |
| 4,214,673 | 7/1980 | Heath et al. . |
| 4,245,859 | 1/1981 | Rainin .................................. 294/1.2 |
| 4,261,608 | 4/1981 | Bradshaw ............................ 294/25 |
| 4,269,324 | 5/1981 | Hausam . |
| 4,330,936 | 5/1982 | Swarth . |
| 4,676,396 | 6/1987 | Mamolou ............................ 294/1.1 |

Primary Examiner—Johnny D. Cherry
Attorney, Agent, or Firm—Christie, Parker & Hale

[57] ABSTRACT

Two arms are pivotally connected at their upper ends. Each arm has at its lower end a rounded gripping surface comprising a tip made of a high-friction material. At the pivot, there is a spring urging the arms apart. When in use, the tool is held so that the tips of the arms touch the paper to be lifted, the arms are pressed together until they are side by side, a portion of the paper is caught and pinched between the arms, and the paper is lifted and separated from the stack.

4 Claims, 3 Drawing Sheets

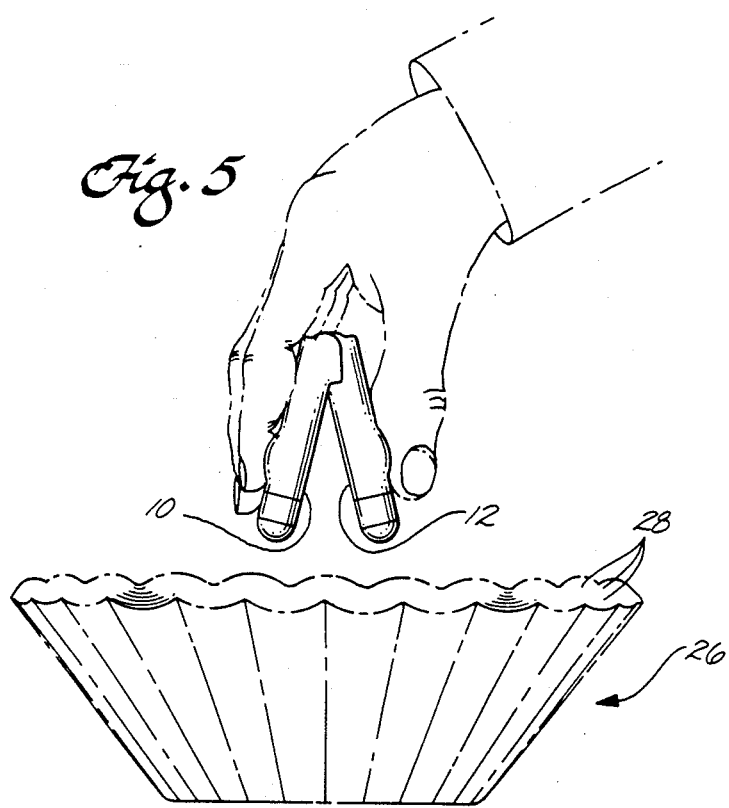
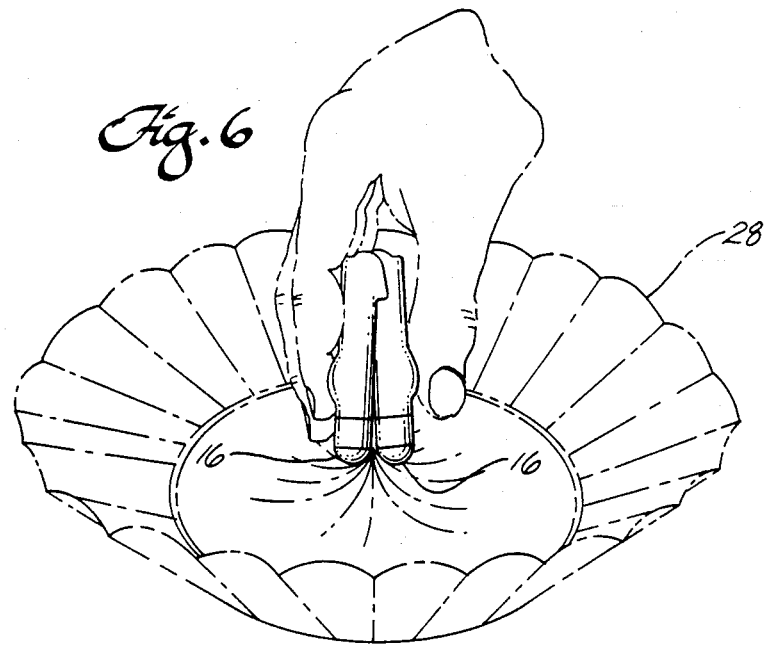

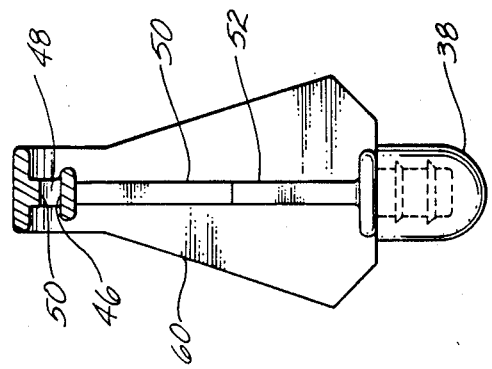
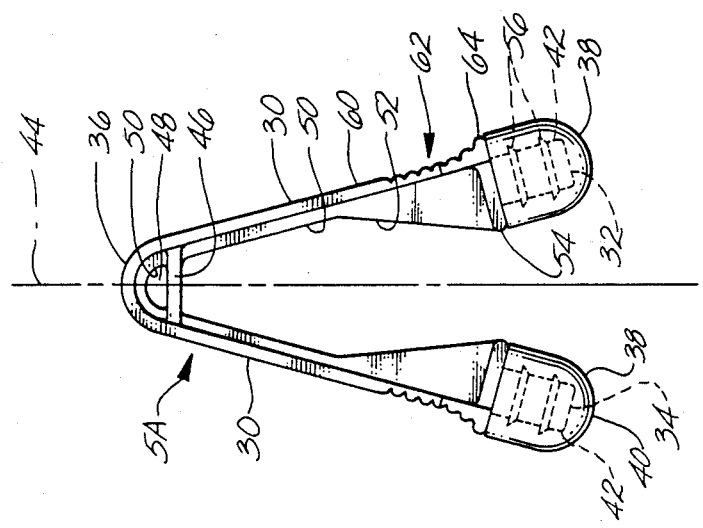
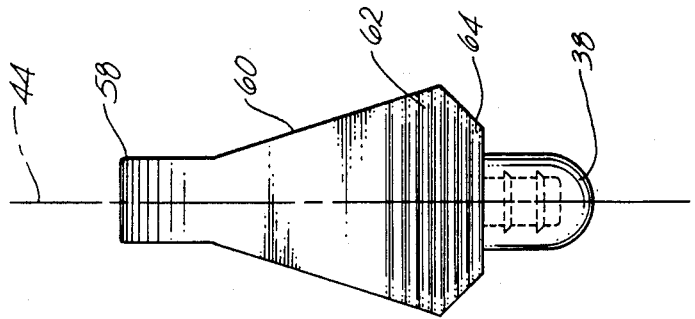

PAPER PICK-UP DEVICE

CROSS-REFERENCE TO RELATED APPLICATIONS

This application is a continuation of application Ser. No. 06/859,045, filed May 2, 1986, now abandoned, which is a continuation-in-part of application Ser. No. 06/732,144, filed May 9, 1985, now abandoned.

BACKGROUND OF THE INVENTION

1. Field of the Invention

This invention relates to a tool for picking up sheet material, such as papers, especially for picking up coffee filter papers.

2. Related Art

In recent years, automatic coffee makers have become widely used. They are especially popular in offices and in commercial establishments, where large amounts of coffee are served. The coffee makers typically have an upper reservoir where water is heated and slowly released over a supply of ground coffee located below the reservoir. The supply of ground coffee is placed in a cup-shaped filter paper, which, in turn, is placed in a cup-shaped holder. The hot water slowly drips from the reservoir through the coffee grounds into a container positioned below the holder. The filter papers retain the coffee grounds, while letting the liquid coffee through and, thus, are an integral part of providing clear grounds-free coffee.

The cup-shaped filter papers, generally called coffee filters, are usually sold in a stack, which may contain as many as a hundred filters per pack. The filter papers generally have a rippled or flute-like shape. This shape, combined with the stacking and static attraction, causes the filters to adhere to one another, making it difficult to retrieve a single filter from the stack by hand. It is not uncommon to pick up two or three filters at a time, although only one is desired. Due to the thinness of the filter paper, this may not always be noticed; however, the quality of the coffee is noticeably diminished if two or more coffee filters are mistakenly used in the coffee holder. This inability to extract a single coffee filter quickly and easily is a particular inconvenience in commercial establishments, where large amounts of coffee are served, often under severe time pressures.

Attempts have been made to solve this problem by providing coffee filter dispensers. Two such dispensers are disclosed in U.S. Pat. No. 4,214,673 and U.S. Pat. No. 4,269,324. Such dispensers, however, necessitate the storage of the coffee filters in the dispensing device. A small hand-held tool for picking up coffee filters, on the other hand, could be carried around in one's pocket and used to pick up coffee filters at different locations. In addition, a hand-held device could easily be left in each nest of coffee filters and used as the need arises. Prior pick-up devices include the pick-up tongs for picking up trash disclosed in U.S. Pat. No. 3,692,347. These pick-up tongs, however, operate on a different principle and would not be suitable for lifting coffee filters.

SUMMARY OF THE INVENTION

This invention comprises a paper pick-up tool having a pair of arms pivotally connected at their upper ends and having, at the lower ends, rounded tips made of a high-friction material, such as rubber. In one embodiment, the arms are biased by two fingers of a spring urging the arms apart. When the tool is in use, pressure is applied to each arm to force the arms together while the tips bear against the base portion of the filter. The coffee filter is caught and pinched between the two tips and thus extracted, the two arms being held together all the while. The high-friction material at the tips facilitates the adhesion of the paper to the tips, and the rounded ends prevent damage to the paper, such as tearing, puncturing, or the like.

BRIEF DESCRIPTION OF THE DRAWINGS

The features of a specific embodiment of the best mode of carrying out the invention are illustrated in the drawings, in which:

FIG. 5 shows the pick-up tool of FIG. 1 poised above a stack of coffee filters;

FIG. 6 shows the pick-up tool supporting a single coffee filter from a stack of filters;

FIG. 7 shows a side elevation of a further embodiment of the paper pick-up tool according to the present invention;

FIG. 8 is a top plan view of the pick-up tool of FIG. 7; and

FIG. 9 is a side section of the pick-up tool of FIG. 7.

DETAILED DESCRIPTION OF THE PREFERRED EMBODIMENTS

Figure 1:
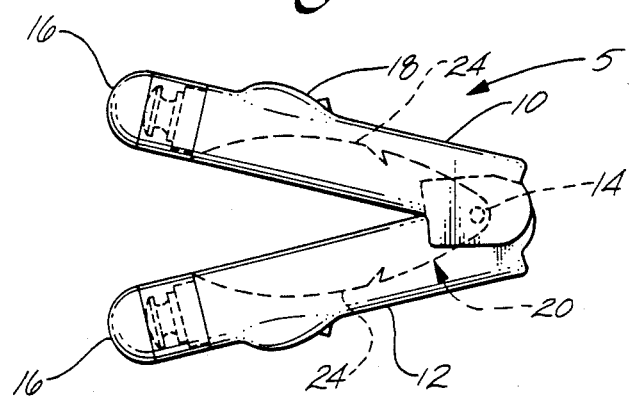
FIG. 1 is an elevation view of a paper pick-up tool according to the present invention.
Figure 4:
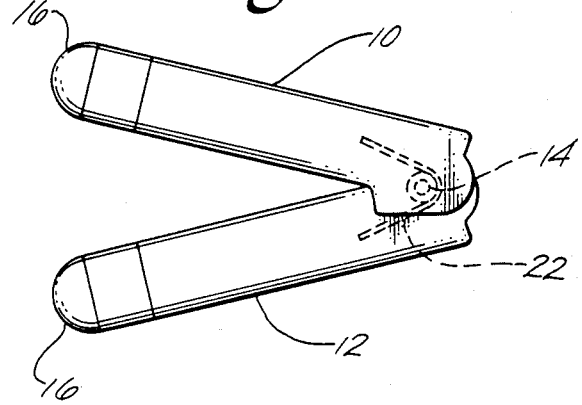
FIG. 4 shows a side elevation view of an alternate embodiment of the pick-up tool.

FIG. 1 shows an elevational view of an embodiment of a tool 5 according to the present invention. In this embodiment, the tool comprises a pair of arms 10 and 12, connected at one end by a connecting means, such as a pin 14. The pin 14 acts as a pivot so that the opposite ends of the arms, which are free, can be moved relative to each other. The lower ends of the arms have rounded tips 16, which act as gripping surfaces in picking up a thin sheet of material, such as a coffee filter. In the presently preferred embodiment, the tips are made of a high-friction material, such as ethylene propylene, natural rubber, and other similar high-tack materials. The tips may be secured to the free ends of the arms or may be integrally formed as part of the arms themselves at the free ends. In the embodiment shown in the drawing, the arms also include lateral wings 18 integrally molded as part of the arms just above the tips. These wings provide surfaces for supporting the user's fingers when exerting force on the arms and, thus, render the use of the tool more convenient. However, they are not essential to practice the invention. FIG. 4 shows an embodiment of the tool where the arms are flat and have no protruding wings.

Figure 2:
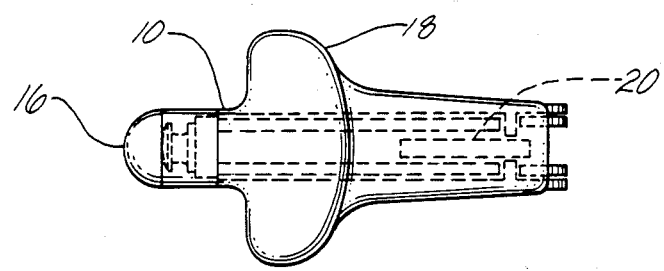
FIG. 2 is a top plan view of the paper pick-up tool shown in FIG. 1.
Figure 3:
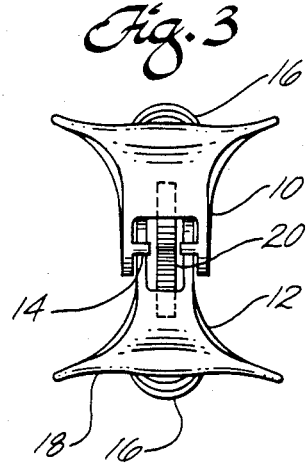
FIG. 3 is a rear elevation view of the paper pick-up tool shown in FIG. 1.

As can be seen in FIGS. 1–4, a spring is disposed about pin 14. The spring can be a flat spring 20, as shown in FIGS. 1–3, or a coil spring 22, as shown in FIG. 4. Spring 20 has two fingers 24, which extend outwardly and away from pin 14 at an acute angle relative to each other. The fingers of the spring bear against the underside of the arms and bias the arms apart when the tool is at rest. A flat surface on arm 10 bears against arm 12 and acts as a stop to prevent further outward pivoting of arms 10 and 12.

FIG. 5 shows the paper pick-up device 5 poised above a nest 26 of filter papers 28. When the tool is in use, finger pressure is exerted on the two arms 10, 12 of the tool, forcing them towards each other. If the tool is held just above the nest of filter papers, and with the tips 16 bearing against the paper as the arms are drawn together, a portion of only the topmost sheet of the filter papers 28 will be pinched between the two arms.

As shown in FIG. 6, the coffee filter 28 is then lifted out and away from the nest or stack, the two arms being held together against the spring-biasing force of spring 20 in order to retain the paper. This procedure results in the removal of the topmost coffee filter only, and is a fast and convenient way of separating it from the rest of the stack.

FIG. 7 shows a further embodiment of a separator for flexible sheet material in the form of a pick-up tool 5A. The pick-up tool includes a pair of arms 30 diverging with respect to each other to respective ends 32 and 34. The arms are coupled together at a junction 36 spaced apart from the ends such that a force tending to join the ends, and a force tending to separate the ends, are both resisted. First and second blunt tips 38 and 40, respectively, are mounted on respective tip bases 42 on the ends of each arm for frictionally engaging the paper (not shown). Each arm extends an equal distance and at an equal angle on each side of a bisecting axis 44. A bridge 46 extends between, and separates, each arm for maintaining the arms in their respective positions absent a deforming force. The bridge serves to more evenly distribute the forces created in the arms and junction over a larger portion of the arms than would occur if the bridge were absent. If the bridge were absent, the forces created in the junction 36 due to compression or expansion of the arms with respect to each other would be focused at the apex of the junction 36. Each end of the bridge, at the point where the bridge intersects a respective arm, acts as a fulcrum for that arm about which the arm rotates when an expansion or compression force is applied to the arms. The bridge also biases the arms apart a predetermined distance.

The bridge 46 and junction 36 combine to form a slot 48. The slot may accommodate a tether (not shown) or attachment to a coffee machine or other counter device.

A flange 50 is formed at the center of each arm and extends inwardly toward the other arm and the interior of the pick-up device. Each arm has a flange portion, and the slot includes a respective flange. Each arm further includes a gusset 52 extending toward the other arm and the interior of the pick-up device. Each gusset is mounted to the center of the arm similar to each flange. Each gusset extends from an end of a respective flange to a base support 54 to which the tip base 42 is mounted.

Each tip base is preferably round in transverse cross section and substantially forms a cylinder having a cylindrical surface. The cylindrical surface of each tip base includes a pair of ridges 56 extending circumferentially about the cylindrical surface of the tip base and spaced apart from each other along a central axis of the tip base 42. Each ridge preferably includes a sloped surface from the top of the ridge sloping downwardly and away from the top surface toward the end of the tip base opposite the junction 36. The face of each ridge closest the junction 36 preferably extends perpendicular to the cylindrical surface of the tip base. This allows for easy mounting of the tip 38, but inhibits easy removal of the tip.

Considering FIG. 8, each arm 30 includes a first portion 58 having a constant width and a grip 60 extending outwardly and away from the junction 36 to knurled grips 62 and a finger stop 64. The knurled grips are preferably formed in the grip 60 by ridges and grooves extending transversely of the arm 30.

The angle between the interior surface of arm 30 and the bisecting axis 44 is 16.5°. The angle between the exterior surface of the arm and the bisecting axis 44 is 18°. The angle between the interior surface of the arm and the interior surface of base support 54 is 83.5°. The length of each arm from the tip of junction 36 to the outside edge of the finger stop 64 is 2.375 inches. The length of the gusset 52 from flange 50 to the outside edge of the finger stop is 1.00 inch. The height of flange 50 from the inside surface of arm 30 and below bridge 46 is 0.078 inch. The radius of curvature of flange 50 in slot 48 is 0.172 inch. The radius of curvature of the junction 36 is 0.25 inch. The radius of curvature of the outside surface of junction 36 is 0.312 inch. The distance from the interior surface of the arm to the outside edge of gusset 52 at the point where the gusset joins the base support 54 is 0.394 inch. The distance between the outside edge of the finger stop and the end of tip base 42 is 0.500 inch. The thickness of the finger stop 64 and of the base support 54 is 0.09 inch. The angle between the base tip 42 and the finger stop, and therefore the base support 54, is 90°. The distance between the center of the end of tip base 42 and the bisecting axis 44 is 0.756 inch. The length of the grip 60 is 1.75 inch to the outside edge of the finger stop 64. The width of the junction 36 is 0.55 inch. The grip extends laterally from the arm at an angle of 33° with respect to the bisecting axis 44. The distance between adjacent surfaces of ridges 56 is 0.156 inch. The thickness of each ridge is 0.046 inch. The distance between the end of tip base 42 and the adjacent surface of the first ridge is 0.125 inch. The diameter of the tip base is 0.312 inch, and the diameter of each ridge is 0.406 inch. The arms of the pick-up device are preferably made from hardened polyvinyl chloride. The material also may be nylon or 10 to 20% glass-filled polypropylene.

Each tip 38 is 0.648 inch in overall length. The tip has an end having a radius of 0.312 inch. The distance between the outside surface of finger stop 64 to the beginning of the tip end is 0.495 inch. The inside diameter of the tip is 0.295 inch, and the tip includes grooves corresponding to the ridges 56 having an inside diameter of 0.310 inch. The outside diameter of each tip is 0.531 inch. The tip is preferably made from NBR rubber, FDA grade. The rubber preferaly has a 40 to 45 durometer shore A reading. The tip may also be made from EPDM rubber.

These dimensions and materials have been found to be preferred for the purpose and function of the pick-up device. The bridge provides a device having a longer life and greater integrity. With the combined dimensions of the arms and tips, the straight sides of the tips, i.e. that portion between the outside edge of the finger stop and the beginning of the tip end, will meet when the arms of the device are brought together. This provides a maximum of surface area contact between the sides of the tips and the paper being picked up. The tips are rounded at the ends to enhance the ability to grip the paper being picked up by increasing the surface area of contact between the tip and paper. For the given angle between the bisecting axis and each arm, the distance between the ends of the tips is approximately 1.5 inch. This is preferred since a lesser distance would result in slipping of the paper underneath the tips and would result in less material being grasped between the straight surfaces of the tips. If the distance were larger, the downward pressure on the paper created while squeezing the arms would be greater than otherwise as the pair of arms are brought together. This is especially significant when the number of filter papers in the stack is about 8 or 10 filters.

The NBR rubber is preferred because it is self-cleaning, has the desired tackiness, and does not accumulate appreciable amounts of paper fiber. As a result, the tips are less likely to become clogged with paper fibers with extended use.

The preceding description represents only several embodiments of the invention. Persons skilled in the art will appreciate that alterations can be made in the embodiments without departing from the essence and scope of the invention. For instance, the tool can be constructed without the use of a spring to bias the arms apart. To use the tool, the arms would be pulled apart and pushed back together to pinch and pick up the filter paper. The tool is also not limited to picking up coffee filters, but can be used to pick up other flexible sheets of material, such as plastic films, thin sheets of paper cloth, and the like.

What is claimed is:

1. A hand-sized pick-up device providing means for finger and thumb controlled manipulation of a plurality of sheets comprising:
   (a) a first arm having a free end and a fixed end,
   (b) a second arm having a free end and a fixed end,
   (c) hinge means integrally joining together each of said fixed ends at a point defining an apex,
   (d) a high-friction tip of a rubber-like material having a high tack attached to the free end of each arm, each tip having the form of a cap having an outwardly facing semi-spherical face portion whereby when the tips are placed against a stack of flexible paper sheets and the arms are squeezed together, a single sheet of paper is secured between the tips for lifting from the stack, and
   e) a structural cross-member integrally formed with each arm near the apex defining an aperture between the cross-member and the apex and providing structural integrity and a pivoting fulcrum for each arm of the pick-up device adjacent the apex, each arm further including
   a post portion integrally formed with the free end of the arm,
   mounting means on the post portion for engaging the tip,
   a flange extending longitudinally of each arm for providing structural reinforcement of the arm, and
   a gusset integrally formed with the flange and post portion for providing structural reinforcement of the joint between each arm and the post portion.

2. A pick-up device as claimed in claim 1 wherein the arms and hinge means are formed so as to provide a biasing action forcing the arms apart in the rest position.

3. A pick-up device as claimed in claim 2 where the arms include wing-like protrusions adjacent to the tips therefor facilitate manual handling of the device.

4. A pick-up device as claimed in claim 3 wherein the high-friction material is selected from the class consisting of rubber and ethylene propylene.

* * * * *